United States Patent
Georgii

[11] Patent Number: 6,008,428
[45] Date of Patent: Dec. 28, 1999

[54] METHOD AND DEVICE FOR STORING HAZARDOUS WASTE

[75] Inventor: Hans Georgii, London, United Kingdom

[73] Assignee: Hydro Betong AB, Stockholm, Sweden

[21] Appl. No.: 08/860,824
[22] PCT Filed: Jan. 10, 1996
[86] PCT No.: PCT/SE96/00011
  § 371 Date: Jul. 10, 1997
  § 102(e) Date: Jul. 10, 1997
[87] PCT Pub. No.: WO96/21932
  PCT Pub. Date: Jul. 18, 1996

[30] Foreign Application Priority Data

Jan. 10, 1995 [SE] Sweden .................................. 9500062

[51] Int. Cl.$^6$ ...................................................... G21F 9/00
[52] U.S. Cl. ................................ 588/16; 588/3; 376/272; 250/506.1
[58] Field of Search ................. 376/272; 250/506.1; 588/16, 3

[56] References Cited

U.S. PATENT DOCUMENTS 4,257,912  3/1981  Fleischer et al. .
4,634,875  1/1987  Kugeler et al. ...................... 250/506.1
5,327,469  7/1994  Georgii .................................... 376/272

FOREIGN PATENT DOCUMENTS 34 04 666   8/1985   Germany .
35 15 871   11/1986  Germany .
1 250 009   10/1971  United Kingdom .

Primary Examiner—Ngoclan Mai
Attorney, Agent, or Firm—Browdy and Neimark

[57] ABSTRACT

A device for the storage of hazardous waste, particularly radioactive waste, comprises a storage unit (10) comprised of an essentially cylindrical concrete body (11) having a central cavity for receiving a waste container (A) and passages for a flowing coolant arranged about the central cavity. The central cavity is defined by a vessel (13), preferably cylindrical and concentric with the concrete body (11), which is embedded in the concrete and hermetically sealable prior to the casting of the concrete. The coolant passages are defined by tubes (14) which are also embedded in the concrete and the lumens of which are in constant open communication with the interior space of the vessel (13).

20 Claims, 2 Drawing Sheets

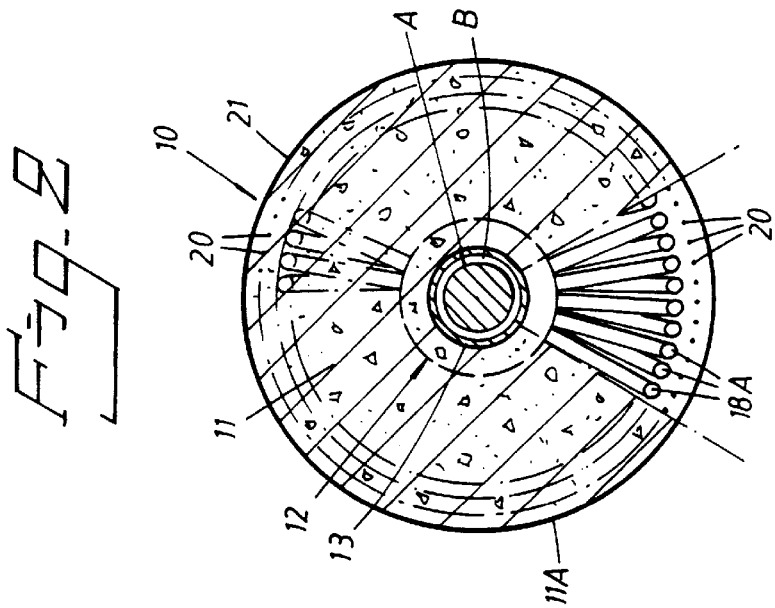
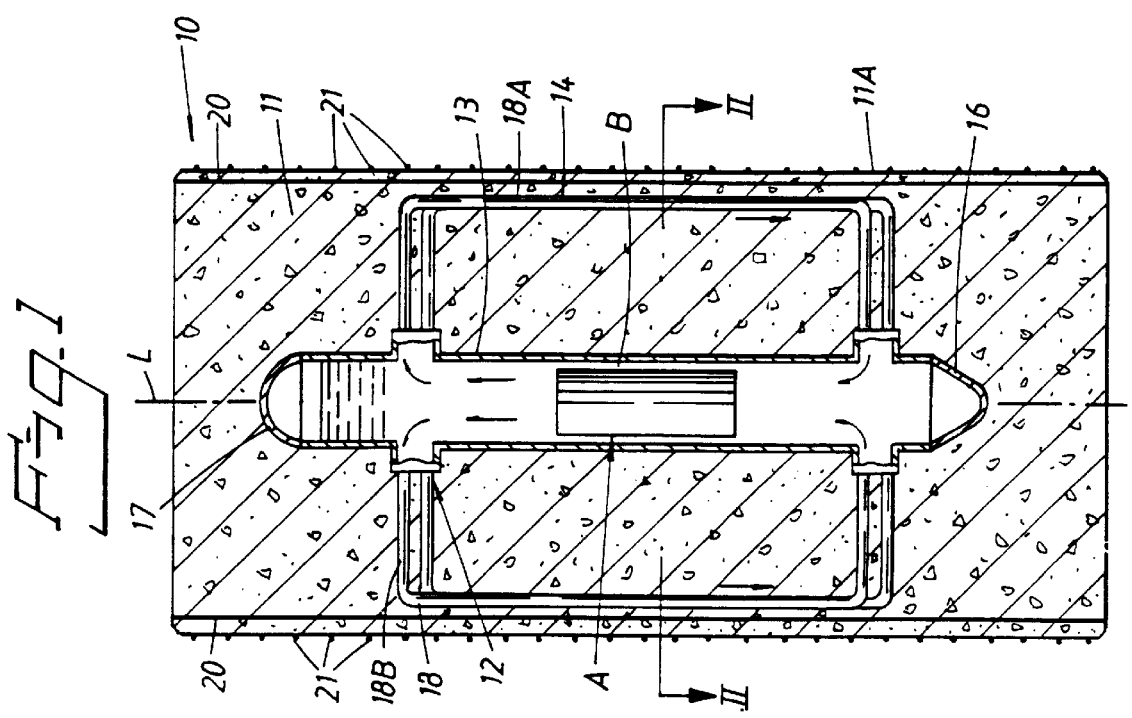

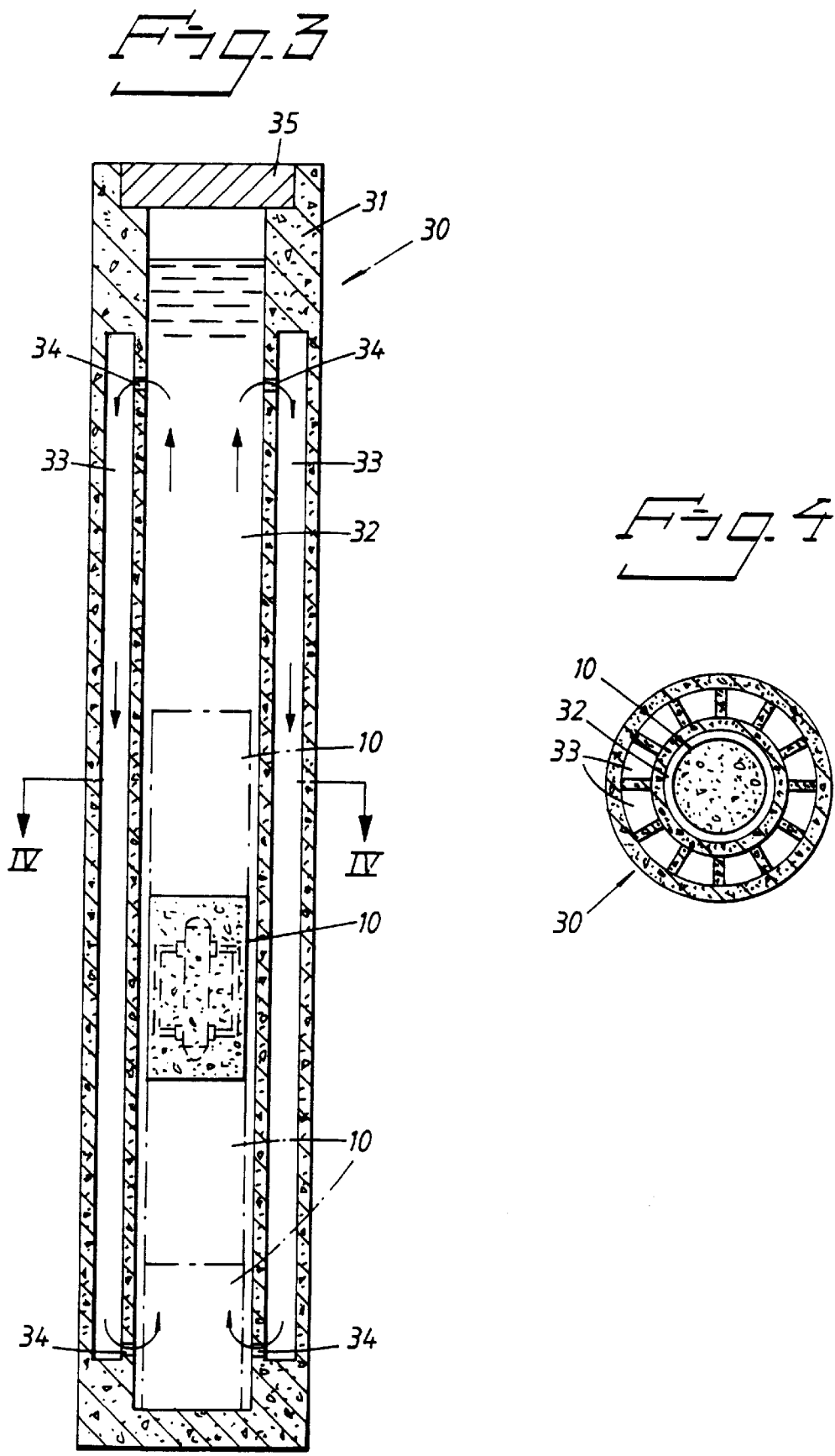

METHOD AND DEVICE FOR STORING HAZARDOUS WASTE

This invention relates to a method and a device for the storage of hazardous waste, particularly radioactive waste, such as, for example, spent nuclear fuel rods and the like, which may require storing in a safe manner for a long time, such as for decades or even centuries.

Storage in accordance with the invention may take place both for so-called final storage and for temporary storage, i.e. in cases where it may be desired to process or recycle the waste after it has been stored for a shorter or longer period of time.

WO 91/05351 discloses a system for the offshore storage of the kind indicated above. This system comprises primary storage units in the shape of cylindrical concrete bodies having a central cavity for receiving waste and a secondary storage unit in the shape of a substantially larger concrete structure adapted to be submerged to a storage site on the seabed and to receive in the submerged position a large number of the primary storage units. Both the primary storage units and the secondary storage units have flotation or ballast tanks which may be filled with water or emptied so that the units may be transported on the water surface to the storage site where they may be submerged or made to rise to the surface again.

The storage units with which the present invention is concerned in some respects resemble the storage units of the prior art system, e.g. because the primary storage unit is a concrete body having a central cavity for the waste and passages for a flowing coolant which are arranged about the central cavity. Accordingly, the present invention may be regarded as being based on the prior art technique disclosed in the above-mentioned publication.

The invention will be described in greater detail below, reference being had to the accompanying diagrammatic drawings which show an exemplary embodiment of a primary storage unit and a secondary storage unit.

FIG. 1 is an axial sectional view of a primary storage unit;

FIG. 2 is a cross-sectional view, taken along the line II—II in FIG. 1, of the primary storage unit;

FIG. 3 is an axial sectional view of a secondary storage unit;

FIG. 4 is a cross-sectional view, taken along the line II—II in FIG. 1, of the secondary storage unit.

As shown in FIG. 1 the primary storage unit 10 is comprised of an essentially cylindrical (or slightly conical) steel-reinforced concrete body 11, a container assembly 12 completely enclosed in the concrete body and consisting of a circular-cylindrical tubular vessel 13 which is concentric with the concrete body, and a system 14 of tubes which communicate with the interior space of the vessel. The container assembly is made of a corrosion resistant material, preferably stainless steel or copper.

The primary storage unit 10, contains, within the vessel 13, a circular-cylindrical metal capsule A containing the hazardous waste to be stored, such as spent nuclear fuel rods. Supporting and locating members (not shown) keep this container centred in the vessel 13 such that there is an annular gap B around the container and the inner wall of the vessel. The space within the vessel which is not occupied by the capsule A, and also the system 14 of tubes, are filled with a liquid coolant which can circulate convectively through the vessel around the capsule A and the system 14 of tubes.

The container assembly 12 is hermetically sealed and completely embedded in the concrete from which the jointless concrete body 11 is made. Consequently, there are no passages which may convey fluid between the outer side of the concrete body 11 and the outer side of the container assembly 12 or between the interior of the container assembly 12 and the surrounding concrete.

The ends of the tubular vessel 13 are closed by a lower, substantially conical end wall 16 and an upper, cupola-like end wall 17. The upper end wall 17 has been applied, preferably by welding, after insertion of the capsule A in the vessel 13.

The system 14 of tubes is made up of a large number of C-shaped tubes 18, each comprising a section 18A extending in parallel with the axis L of the concrete body 11 a short distance inwardly of the circumferential surface 11A of the concrete body, and two radial sections 18B which are connected in a jointless manner, preferably by welding, to the vessel 13 near the ends thereof. Suitably, the tube sections 18A are disposed relatively close to the circumferential surface 11A so that heat transported outwardly from the vessel 13 by the coolant can readily be carried away from the storage unit 10 by a coolant which flows around the latter. The circulatory system formed by the system 14 of tubes and the interior space should of course be designed such that the circulation is promoted.

The concrete body 11 is provided with both an axially acting prestressed reinforcement and a radially acting prestressed reinforcement.

The axially acting prestressed reinforcement comprises a ring of prestressed axially extending reinforcement members 20 of steel wire, preferably of high-tensile stainless steel, which are positioned along a circle between the axial tube sections 18A and the circumferential surface of the concrete body.

The radially acting prestressed reinforcement consists of a prestressed steel wire reinforcement 21, preferably of high-tensile stainless steel, which is wound around the circumferential surface 11A of the concrete body 11 and accordingly is not embedded in the concrete.

Both reinforcements 20 and 21 provide an effective protection for the system 14 of tubes so that damage to this system is avoided in the event of the concrete body 11 being subjected to impacts or other violent action from the outside.

Preferably, the area of the concrete body which is axially opposite to the upper end wall 17 is devoid of steel reinforcement so that the concrete in that area, and also the upper end wall, can be quickly and precisely drilled away to make the capsule A accessible without damaging it and enable the capsule to be taken out.

Production of the storage unit 10 is carried out in the following manner.

First the capsule A is placed in the container assembly 12 which is open only at the upper end of the vessel 13 and filled with the coolant (water). The upper end wall 17 is then applied such that the container assembly will be sealed.

If the casting does not take place immediately after the sealing of the container assembly 12, the latter can be positioned in a cooling basin pending the casting.

In preparation for the casting the sealed container assembly 12 is positioned in a concrete casting mould of steel in which the reinforcement members 20 are mounted in prestressed condition.

The poured concrete is allowed to set sufficiently whereupon demoulding takes place. Heat produced by the contents of the capsule is taken up by the concrete and accelerates the setting so that demoulding can take place after a short time, half a day or possibly only a few hours. After some additional time the prestressed reinforcement members 20 are relieved. If necessary, the concrete body may be placed in a cooling basin.

The finished concrete body 11 is provided with the radially acting reinforcement 21 by winding the prestressed reinforcement wire about the circumferential surface 11A and securing the wire ends.

After the storage unit 10 has thus been made, it may be placed in the secondary storage unit which is shown in FIG. 3 and generally designated by 30.

The secondary storage unit 30 is also comprised of a circular-cylindrical tubular concrete body 31 with a central circular-cylindrical cavity and a surrounding ring of axial coolant passages 33 which communicate with the cavity 32 near the ends thereof by way of radial passages 34. The cavity 32, which is hermetically sealed at the upper end thereof by means of a removable cover 35, is intended to hold a plurality of stacked primary storage units 10 centred in the cavity by means of suitable locating members (not shown) so that there is an annular gap between the wall of the cavity and the stack of storage units 10 through which a liquid coolant (water) can circulate convectively. FIG. 2 shows a primary storage unit 10 in full lines and additional such units in dash-dot lines. If desired, the units may of course be kept separated axially by lugs on the end faces of the units or separate interposed bodies.

I claim:

1. A device for the storage of hazardous waste, particularly radioactive waste, comprising a storage unit (10) comprised of an essentially cylindrical concrete body (11) having a central cavity for receiving a waste container (A), passages for a flowing coolant being arranged about the central cavity, the central cavity being defined by a vessel (13), which is concentric with the concrete body (11) and embedded in the concrete, characterised in that the vessel (13) is hermetically sealed prior to the casting of the concrete body (11), and completely and jointlessly embedded in the concrete, and the coolant passages are defined by tubes (14) which are also completely and pointlessly embedded in the concrete and the lumens of which are in constant open communication with the interior space of the vessel (13).

2. A device according to claim 1, characterised in that a ring of axially extending prestressed reinforcement members (20) is disposed in the concrete body (11) between the tubes (14) and the circumferential surface (11A) of the concrete body (11).

3. A device according to claim 1, characterised in that a prestressed wire reinforcement (21) is wound about the circumferential surface (11A) of the concrete body.

4. A device according to claim 1, characterised in that a substantial portion of the tubes (14) which define the coolant passages is disposed in the radially outer portion of the concrete body (11).

5. A device according to claim 1, characterised in that the vessel (13) and the tubes (14) are made of a corrosion resistant material.

6. A device according to claim 1, characterized in that the ends of the vessel (13) are closed by convex end walls (16, 17).

7. A device for the storage of hazardous waste, particularly radioactive waste, comprising a cylindrical storage body (31) of concrete, said concrete body having a central cylindrical cavity (32) with a sealable opening for inserting a waste container in the cavity, passages (33) for a flowing coolant being arranged about the central cavity (32), characterised in that the storage body (31) constitutes an outer receptacle, in the cavity (32) of which a plurality of storage units (10) according to claim 1 can be introduced to form a stack of such storage units in the cavity, and in that said coolant passages (33) communicate with said central cavity (32) in a closed circulation system.

8. A method for enclosing hazardous waste, particularly radioactive waste, in a concrete body, characterised by introducing the waste into a vessel (13), which is made of a corrosion resistant material and is surrounded by a ring (14) of coolant tubes, the lumens of which communicate freely with the interior space of the vessel, and then sealing the vessel (13), and thereupon completely and jointlessly embedding the sealed vessel including the waste enclosed therein and the ring (14) of coolant tubes in a cast concrete body.

9. A method according to claim 8, characterised by disposing in a casting mould in which the embedding is carried out a ring of prestressed reinforcing members (20) outside the ring (14) of cooling tubes.

10. A method according to claim 8, characterised by winding a prestressed wire reinforcement (21) about the cast concrete body (11).

11. A device according to claim 1, wherein said vessel (13) is cylindrical.

12. A device according to claim 11, characterised in that a prestressed wire reinforcement (21) is wound about the circumferential surface (11A) of the concrete body.

13. A device according to claim 12, characterised in that a substantial portion of the tubes (14) which define the coolant passage is disposed in the radially outer portion of the concrete body (11).

14. A device according to claim 5, wherein said corrosion resistant material is stainless steel.

15. A device according to claim 2, wherein the vessel (13) and the tubes (14) are made of stainless steel.

16. A device according to claim 2, characterised in that the ends of the vessel (13) are closed by convex end walls (16, 17).

17. A device for the storage of hazardous waste, particularly radioactive waste, comprising a cylindrical storage body (31) of concrete, said concrete body having a central cylindrical cavity (32) with a sealable opening for inserting a waste container in the cavity, passages (33) for a flowing coolant being arranged about the central cavity (32), characterised in that the storage body (31) constitutes an outer receptacle, in the cavity (32) of which a plurality of storage units (10) according to claim 16 can be introduced to form a stack of such storage units in the cavity, and in that said coolant passages (33) communicate with said central cavity (32) in a closed circulation system.

18. A device for the storage of hazardous waste, particularly radioactive waste, comprising a cylindrical storage body (31) of concrete, said concrete body having a central cylindrical cavity (32) with a sealable opening for inserting a waste container in the cavity, passages (33) for a flowing coolant being arranged about the central cavity (32), characterised in that the storage body (31) constitutes an outer receptacle, in the cavity (32) of which a plurality of storage units (10) according to claim 3 can be introduced to form a stack of such storage units in the cavity, and in that said coolant passages (33) communicate with said central cavity (32) in a closed circulation system.

19. A device for the storage of hazardous waste, particularly radioactive waste, comprising a cylindrical storage body (31) of concrete, said concrete body having a central cylindrical cavity (32) with a sealable opening for inserting a waste container in the cavity, passages (33) for a flowing coolant being arranged about the central cavity (32), characterised in that the storage body (31) constitutes an outer receptacle, in the cavity (32) of which a plurality of storage units (10) according to claim 4 can be introduced to form a stack of such storage units in the cavity, and in that said coolant passages (33) communicate with said central cavity (32) in a closed circulation system.

20. A method according to claim 8, wherein said waste introduced into said vessel (13) is enclosed in a sealed container (A), and said vessel (13) is cylindrical and is formed of stainless steel.

* * * * *